P. R. RICHARDS.
SAFETY APPLIANCE FOR GAS FIXTURES.
APPLICATION FILED JULY 17, 1911.
1,017,468.
Patented Feb. 13, 1912.
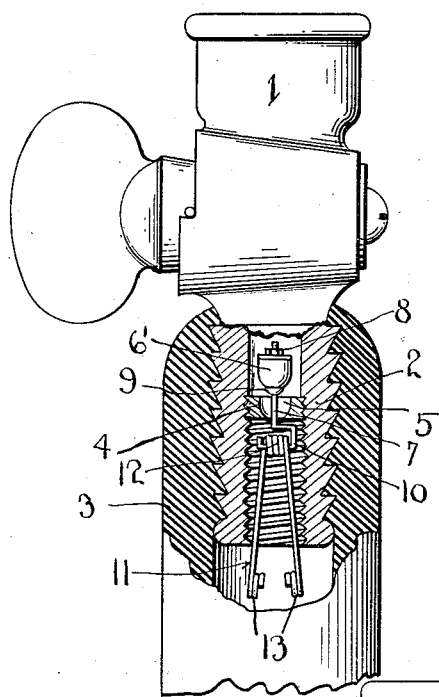
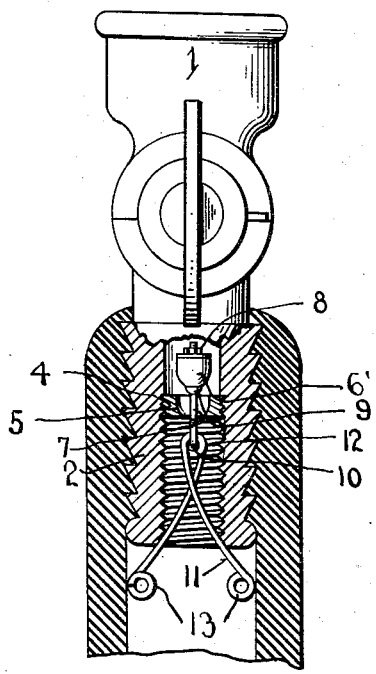
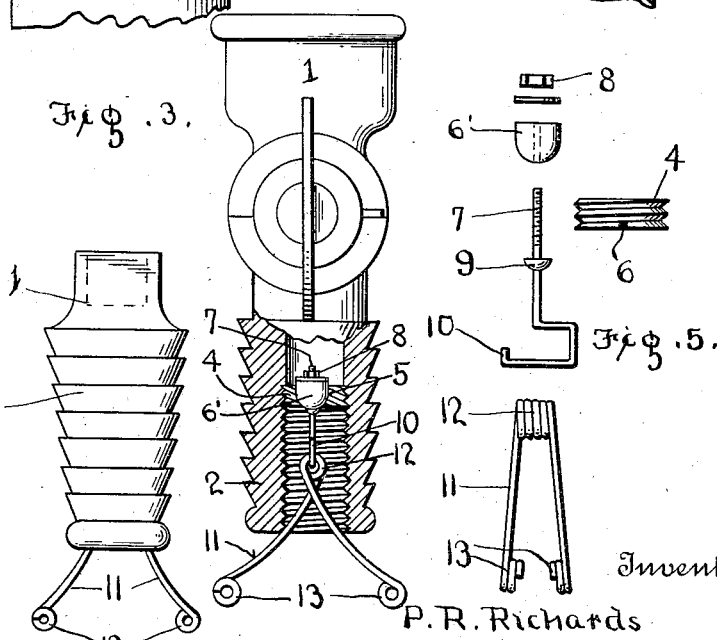
Inventor
P. R. Richards

UNITED STATES PATENT OFFICE.

PETER R. RICHARDS, OF HAZLETON, PENNSYLVANIA.

SAFETY APPLIANCE FOR GAS-FIXTURES.

1,017,468.  Specification of Letters Patent.  Patented Feb. 13, 1912.

Application filed July 17, 1911. Serial No. 639,018.

*To all whom it may concern:*

Be it known that I, PETER R. RICHARDS, a citizen of the United States, residing at Hazleton, in the county of Luzerne and State of Pennsylvania, have invented certain new and useful Improvements in Safety Appliances for Gas-Fixtures; and I do declare the following to be a full, clear, and exact description of the invention, such as will enable others skilled in the art to which it appertains to make and use the same.

This invention relates to improvements in safety appliances for gas fixtures or pipe connections.

One object of the invention is to provide an appliance of this character adapted to be arranged in a gas fixture or coupling member to which a tube is to be connected whereby should the tube become separated from the fixture the flow of gas will be automatically stopped.

Another object is to provide an appliance of this character which will be simple, durable and inexpensive in construction, efficient and reliable in operation and well adapted to the purpose for which it is designed.

With these and other objects in view, the invention consists of certain novel features of construction, and the combination and arrangement of parts as will be more fully described and claimed.

In the accompanying drawings: Figure 1 is a side view partly in section of a valved coupling member or fixture and the end of a tube engaged therewith showing the invention applied thereto; Fig. 2 is a similar view of the coupling taken at right angles to Fig. 1 showing the valve in open position. Fig. 3 is a view similar to Fig. 2 with the tube removed and the valve closed; Fig. 4 is a side view of a different form of coupling with the appliance arranged therein; Fig. 5 is a detail view of the appliance removed and the parts separated.

Referring more particularly to the drawings, 1 denotes a valved coupling or fixture which may be of any suitable design and on one end of which is formed a tube coupling member 2 having a tapered corrugated or roughened outer surface with which is adapted to be engaged the end of the tube 3 which is connected with the coupling member or fixture. The tube coupling member 2 is threaded internally and into the same is adapted to be screwed a valve seat 4.

The valve seat 4 is in the form of a circular plate or disk of suitable thickness and having a threaded outer edge whereby the same is adapted to be screwed into the outer portion of the threaded bore of the member 2. The disk is provided with a centrally disposed passage 5 the walls of which are inclined to form a valve seat for a valve hereinafter described. In the inner face of the disk 4 are formed oppositely disposed notches 6 with which a screw driver or other tool is adapted to be engaged for screwing the disk into and out of operative position in the threaded bore of the member 2.

Adapted to be engaged with the seat formed by the tapered passage 5 in the disk 4 is a conical valve 6′ to which is secured a stem 7, said stem having its inner end extending through the valve and threaded to receive a valve retaining nut 8 between which and a shoulder 9 on the stem valve 6′ is securely fastened. The outer end of the stem 7 is bent to form a right angularly disposed hook 10 with which is engaged a valve operating spring 11. The spring 11 is preferably constructed from a spring wire rod bent midway between its ends to form a series of coils 12 with which the hook 10 of the valve stem is engaged. The ends of the wire after forming the coils diverge or project outwardly in opposite directions and have their extremities bent to form small coils 13 as shown.

When the valve is applied to its seat and arranged in the member 2 the diverging ends of the spring 11 will engage the outer edges of the passage or bore in said member 2, thereby retracting and holding the valve in a retracted or closed position until the tube 3 is applied to the member 2 or when said tube has been disengaged therefrom as shown in Fig. 3 of the drawings. When the tube 3 is engaged with the member 2 the coiled extremities 13 of the spring will be forced together or toward each other by the engagement of said ends with the inner walls of the tube 3, thus projecting or forcing the valve 6′ forwardly to an open position as shown in Fig. 2 of the drawings in which position said valve will remain until the tube 3 is disengaged from the member 2 whereupon the spring action of the ends of the spring will, by their engagement with the end of the member 2 retract or draw the valve into engagement with its seat, thus closing the passage through the member 2 and automatically stopping the flow of gas.

In Fig. 4 of the drawings is shown a plain coupling member or "pillar" having the invention applied thereto. In this form of the device the construction and arrangement of the appliance is exactly the same as that shown and described in the valved coupling illustrated in Figs. 1, 2 and 3 of the drawings.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. In a safety appliance of the character described, a coupling member, a tube adapted to be engaged with said member, a valve seat having a passage, a valve adapted to be engaged with said seat, a stem secured to said valve and extending through said passage, a hook formed on the outer end of said stem, a valve retracting spring having a series of centrally disposed coils arranged to receive the hook end of the valve stem and having diverging ends to engage and project through the end of the coupling member into position to engage the walls of the tube connected with said coupling member whereby said spring ends are contracted and the valve forced and held in an open position while the tube remains in operative engagement with the coupling member and when said tube is disengaged from said member the ends of said spring will expand and draw the valve into engagement with its seat.

2. In a safety appliance of the character described, a coupling member having an interiorly threaded end, a tube adapted to be engaged with said end, a valve seat comprising an exteriorly threaded disk having formed therein a tapered passage and adapted to be screwed into engagement with the interiorly threaded end of said coupling member, a valve adapted to be engaged with the tapered passage in said seat, a stem secured to said valve, a hook formed on the outer end of said stem, a valve retracting spring, said spring having a series of centrally disposed coils adapted to receive the hooked end of the valve stem and having diverging ends adapted to engage and project through the end of the connection of the coupling member, said ends of the spring having their extremities bent into the form of coils adapted to engage the walls of the tube connected with said coupling member whereby said ends of the spring are contracted and the valve thus forced and held inwardly to an open position as long as the tube remains in operative engagement with the coupling member and whereby when said tube is disengaged from said member said ends of the spring will expand against the ends of the coupling member and thereby draw and hold the valve in engagement with its seat thus closing the passage through the coupling member.

In testimony whereof I have hereunto set my hand in presence of two subscribing witnesses.

PETER R. RICHARDS.

Witnesses:
JOHN WILHELM,
HENRY WILHELM.

---

Copies of this patent may be obtained for five cents each, by addressing the "Commissioner of Patents, Washington, D. C."